(12) United States Patent  (10) Patent No.: US 7,523,415 B1
Porter  (45) Date of Patent: *Apr. 21, 2009

(54) EXCLUSIVE USE DISPLAY SURFACE AREAS AND PERSISTENTLY VISIBLE DISPLAY OF CONTENTS INCLUDING ADVERTISEMENTS

(76) Inventor: Swain W. Porter, 12511 89th Ct. NE., Kirkland, WA (US) 98034

( * ) Notice: Subject to any disclaimer, the term of this patent is extended or adjusted under 35 U.S.C. 154(b) by 0 days.

This patent is subject to a terminal disclaimer.

(21) Appl. No.: 09/517,874

(22) Filed: Mar. 2, 2000

Related U.S. Application Data

(63) Continuation-in-part of application No. 09/344,409, filed on Jun. 24, 1999, now Pat. No. 6,570,595.

(51) Int. Cl.
*G06K 15/00* (2006.01)
*G06F 3/00* (2006.01)

(52) U.S. Cl. .................. 715/806; 715/802; 345/619

(58) Field of Classification Search .............. 345/781, 345/803, 804, 790–797, 788, 805, 806, 807, 345/802, 767, 966, 965, 619; 704/276; 725/37
See application file for complete search history.

(56) References Cited

U.S. PATENT DOCUMENTS 5,367,623 A    11/1994  Iwai et al.
5,555,368 A *  9/1996  Orton et al. .................. 715/807
5,617,526 A    4/1997   Oran et al.
5,737,559 A *  4/1998   Orton et al. .................. 715/807

(Continued)

FOREIGN PATENT DOCUMENTS

EP          0 749 081 A1    12/1996

(Continued)

*Primary Examiner*—Steven P Sax
(74) *Attorney, Agent, or Firm*—Schwabe Williamson & Wyatt, P.C.

(57) ABSTRACT

In a computer system having a display device with a display surface, a portion of the display surface is reserved for an exclusive use by a program, to allow contents rendered by the program to be persistently visible. In one embodiment, the reservation is accomplished through reducing the width and height of a shared portion of the display surface managed by a window manager, corresponding to a graphics resolution. In another embodiment, the reservation is accomplished by having the window manager work with a pixel resolution smaller than the operative pixel resolution of the display device driver. In one embodiment, the reservation is made only while the computer system is "on-line". In one embodiment, the exclusive use is to render advertisements in the reserved portion by an advertising rendering program. The advertisements are HTML pages received from an advertisement web server through the Internet. The HTML pages are rendered in the reserved portion through a direct draw component. The direct draw component is provided with the unreduced width and height as the width and height of the surface area to support direct drawing of displays. A cursor control device driver also supports monitoring of movements of a cursor control device and of occurrences of cursor events. The cursor control device driver is likewise provided with the unreduced width and height as the width and height of the surface area to monitor for cursor movements and events. In other embodiments, multiple portions of the display surface are reserved for advertising and/or other exclusive uses. In yet other embodiments, full screen applications, including those that utilize page flipping are accommodated.

32 Claims, 11 Drawing Sheets

U.S. PATENT DOCUMENTS

| | | |
|---|---|---|
| 5,812,132 A | 9/1998 | Goldestein |
| 5,844,569 A * | 12/1998 | Eisler et al. .................. 345/619 |
| 5,874,958 A | 2/1999 | Ludolph |
| 6,016,144 A | 1/2000 | Blonstein et al. |
| 6,018,332 A | 1/2000 | Nason et al. |
| 6,029,195 A | 2/2000 | Herz |
| 6,141,010 A | 10/2000 | Hoyle |
| 6,151,059 A * | 11/2000 | Schein et al. .................. 725/37 |
| 6,266,641 B1 * | 7/2001 | Takaya ....................... 704/276 |
| 6,323,911 B1 | 11/2001 | Schein et al. |
| 6,324,644 B1 * | 11/2001 | Rakavy et al. ................. 713/1 |
| 6,330,010 B1 * | 12/2001 | Nason et al. ................. 345/802 |
| 6,583,793 B1 * | 6/2003 | Gould et al. ................. 345/679 |
| 6,710,790 B1 * | 3/2004 | Fagioli ....................... 715/802 |

FOREIGN PATENT DOCUMENTS

JP          11 167478 A          6/1999

* cited by examiner

EXCLUSIVE USE DISPLAY SURFACE AREAS AND PERSISTENTLY VISIBLE DISPLAY OF CONTENTS INCLUDING ADVERTISEMENTS

RELATED APPLICATION

This application is a continuation-in-part application to U.S. patent application Ser. No. 09/344,409, filed on Jun. 24, 1999, now U.S. Pat. No. 6,570,595 having the same title and same inventor as the present application.

BACKGROUND OF THE INVENTION

1. Field of the Invention

The present invention relates to the field of computer systems. More specifically, the present invention relates to exclusive use display surface areas, and their applications to persistently visible display of contents, such as advertisements.

2. Background Information

With advances in microprocessor and other related technology, today's computers are equipped with processing capabilities that were once the exclusive domain of large mainframe computers. To exploit these capabilities, today's computers are often equipped with multi-tasking operating systems that allow multiple tasks of the same or different applications to be executed at the same time. These operating systems are also typically equipped with windowing managers to manage the concurrent display of the execution results of the various tasks or applications through windowing, within the constraint of the available display surface of a display device. That is, the execution results of the various tasks/applications are rendered in corresponding display windows (hereinafter, simply windows), and these windows share the display surface. This employment of windows along with the use of iconic representations for various programs and "objects" is also often referred to as the desktop metaphor, with the shared display surface area being referred to as the desktop area.

Whether the contents rendered in the various windows are actually visible to a user depend on the relatively placement of the windows within the available display surface. Except for the top window (such as the "in focus" window or another window "rigged" to be "always on top") or windows that do not overlap with other windows (such as windows placed in a tile arrangement), contents of the underlying windows disposed in the overlapping portions are considered obstructed, and generally invisible, unless the top and other intermediate windows are considered "transparent". Contents disposed in the obstructed portions of these underlying windows become visible only when the window manager surfaces the window as the top window, typically responsive to a user request.

Many applications, such as Internet advertising, desire to have at least some of their rendered contents (in the case of Internet advertising, the advertisements themselves) persistently visible to the user. However, "rigging" the browser window to be "always on top" is not necessarily a viable option. Furthermore, in the case of Internet advertisement, even if "rigging" the browser window as "always on top" is a viable option, it still would not fully satisfy its persistent visibility desire. The reason is because most Internet advertisements are rendered in the form of banners, typically disposed at least at the top and at the bottom of a page. The banner advertisement placed at the bottom of a page is typically not visible when the page is first displayed, as the page is typically larger than the browser window. Similarly, the banner advertisement placed at the top of the page becomes invisible as the page is scrolled downward.

Thus, an improved approach to display management that better addresses the persistent visibility requirements of applications, in particular, the persistent visibility requirements of Internet advertising is desired.

SUMMARY OF THE INVENTION

In a computer system having a display device with a display surface, a portion of the display surface is reserved for an exclusive use, allowing contents rendered in the reserve area to be persistently visible. In one embodiment, the reservation is accomplished through reducing the width and height of a shared portion of the display surface managed by a window manager, corresponding to a graphics resolution. In another embodiment, the reservation is accomplished by having the window manager works with a pixel resolution smaller than the operative pixel resolution of the display hardware. In one embodiment, the reservation is made only while the computer system is "on-line". In one embodiment, the exclusive use is to render advertisements in the reserved portion by an advertising rendering program. The advertisements are HTML pages received from an advertisement web server through the Internet. The HTML pages are rendered in the reserved portion through a direct draw component. The direct draw component is provided with the unreduced width and height as the width and height of the surface area to support direct drawing of graphical displays. A cursor control device driver also supports monitoring of movements of a cursor control device and of occurrences of cursor events. The cursor control device driver is likewise provided with the unreduced width and height as the width and height of the surface area to monitor for cursor movements and events. In other embodiments, multiple portions of the display surface are reserved for advertising and/or other exclusive uses. In yet other embodiments, full screen applications, including those that utilize page flipping are accommodated.

BRIEF DESCRIPTION OF DRAWINGS

The present invention will be described by way of exemplary embodiments, but not limitations, illustrated in the accompanying drawings in which like references denote similar elements, and in which:

FIG. 4d illustrates an alternate embodiment to the operation flow of FIG. 4a;

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented using terms such as display surfaces, windows, device drivers, and so forth, commonly employed by those skilled in the art to convey the substance of their work to others skilled in the art. Parts of the description will be presented in terms of operations performed by a computer system, using terms such as rendering, determining, reducing, transmitting, and so forth. As well understood by those skilled in the art, these quantities and operations take the form of electrical, magnetic, or optical signals capable of being stored, transferred, combined, and otherwise manipulated through mechanical and electrical components of a digital system; and the term digital system include general purpose as well as special purpose data processing machines, systems, and the like, that are standalone, adjunct or embedded.

Various operations will be described as multiple discrete steps performed in turn in a manner that is most helpful in understanding the present invention, however, the order of description should not be construed as to imply that these operations are necessarily order dependent, in particular, the order the steps are presented. Furthermore, the phrase "in one embodiment" will be used repeatedly, however the phrase does not necessarily refer to the same embodiment, although it may.

Figure 1A:
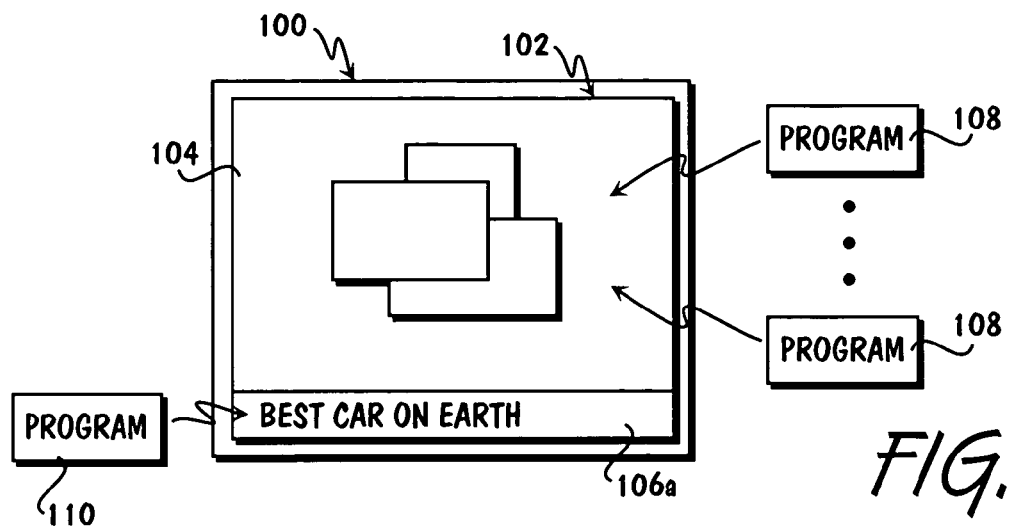
FIGS. 1a-1f illustrate an overview of the present invention, in accordance with six embodiments.
Figure 1B:
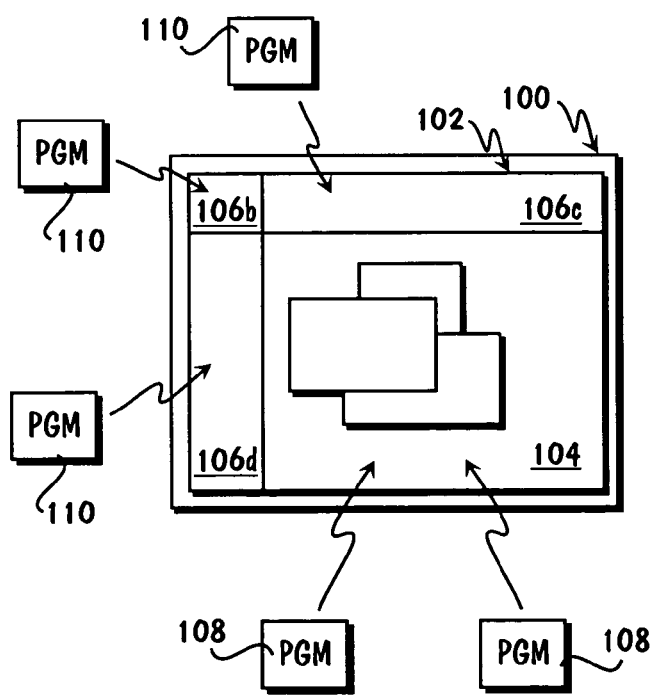
Figure 1C:
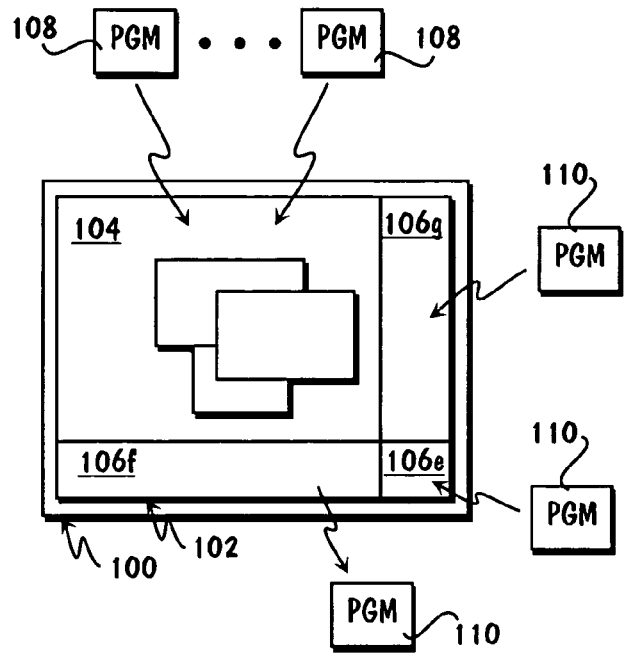
Figure 1D:
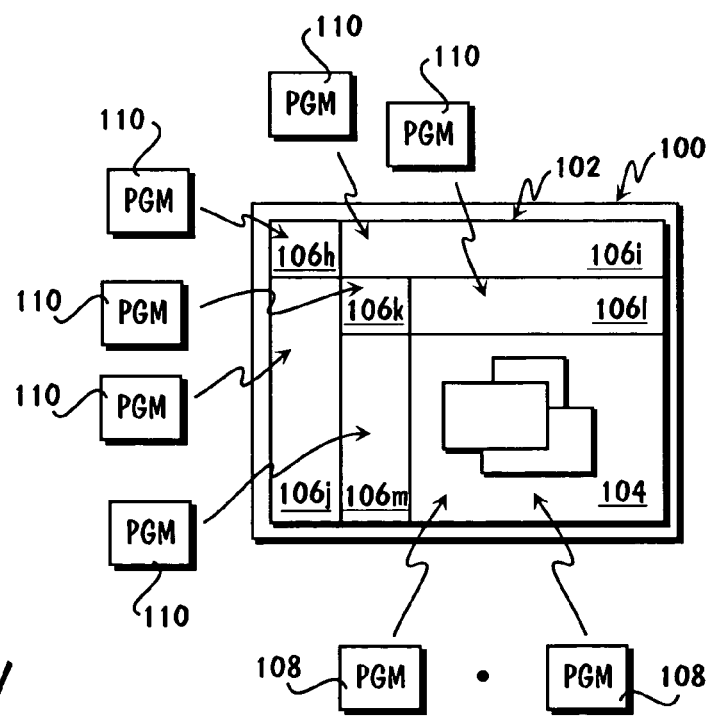
Figure 1E:
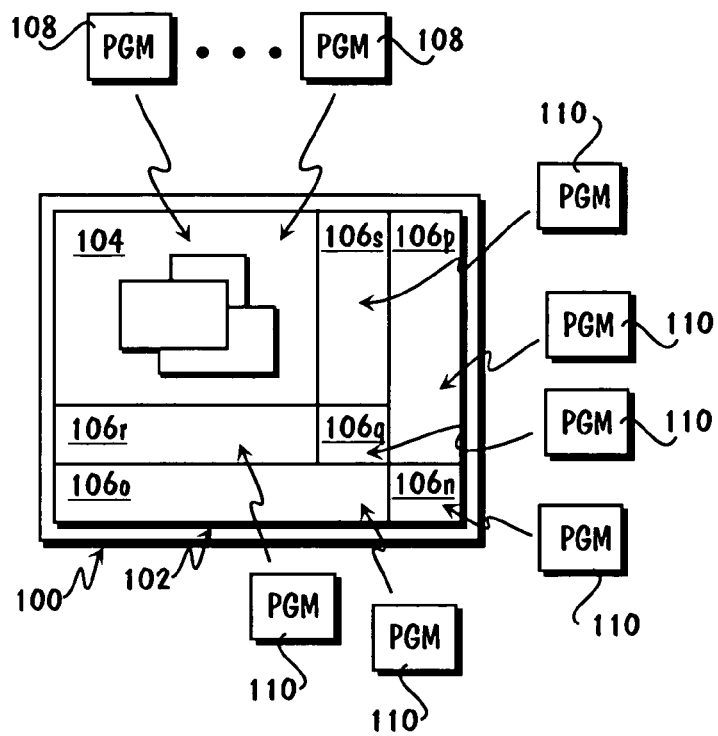
Figure 1F:
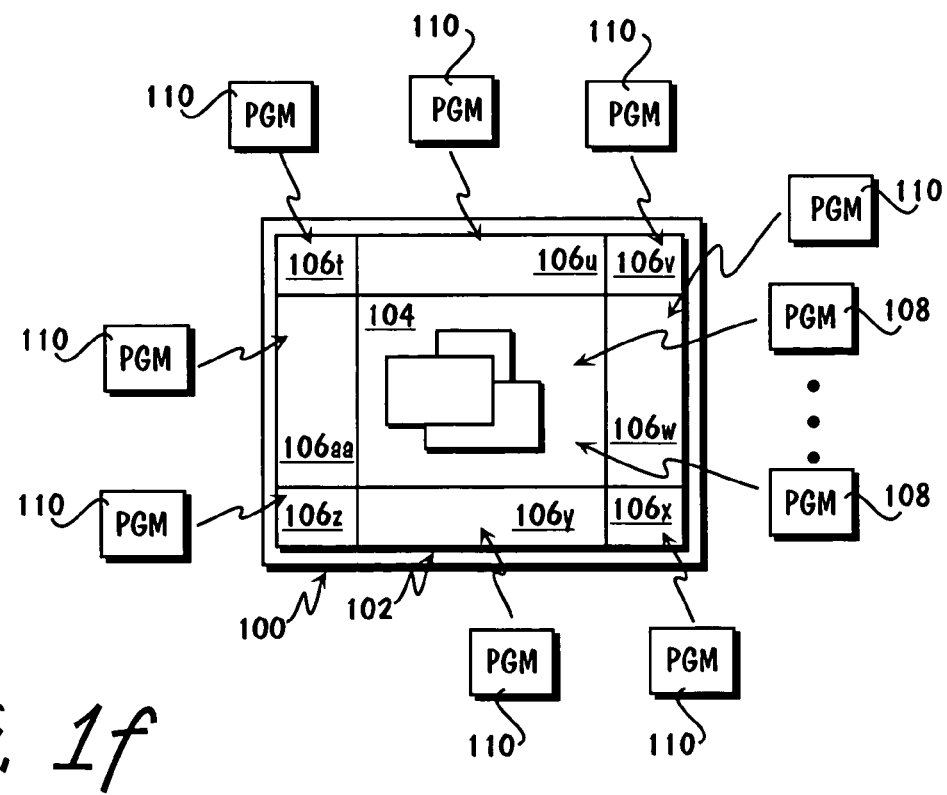

Referring now to FIGS. 1a-1f, wherein six block diagrams illustrating an overview of the present invention in accordance with three embodiments are shown. As illustrated, in accordance with the present invention, displace surface 102 of display device 100 (of a computer system) are divided into display areas 104 and 106a-106aa. Display area 104 is referred to as the shared display area (SDA), where any number of applications 108 (executing on the computer system or remotely, and of a display area sharing type) may render contents in their corresponding windows (disposed inside SDA 104). Display areas 106a-106aa are referred to as exclusive-use display areas (EDA), where only assigned applications 110 (executing on the computer system or remotely, and of an exclusive use type, in terms of display area) may correspondingly render contents into these areas. For FIG. 1a, one EDA 106a disposed along the bottom edge of display surface 102 is set aside or reserved. Whereas, in FIGS. 1b-1c, three EDAs 106b-106d and 106e-106g disposed along the left and top edges and along the right and bottom edges of displace surface 102 respectively, are set aside or reserved. In FIGS. 1d-1e, six EDAs 106h-106m and 106n-106s disposed in two rows along the left and top edges and along the right and bottom edges of displace surface 102 respectively, are set aside or reserved. Finally, in FIG. 1f, eight EDAs 106t-106aa disposed along the perimeter of displace surface 102 are set aside or reserved. As a result, contents rendered into EDAs 106a-106aa by applications 110 are persistently visible to an end-user, without resorting to prior art "rigging" techniques, such as "always on top". As will be described in more detail below, by selectively associating with an application 110, an application 108 may selectively render a portion of its output display in this persistently visible manner, thereby enabling applications (such as advertisement rendering), to overcome the prior art disadvantage of losing visibility to some of the rendered contents (such as banner advertisements), when the rendered contents (such as a displayed page), is scrolled up and down within a display window (such as a browser window).

These and other aspects of the present invention will be described more fully below. However, before doing do, it should be noted that while six embodiments of partitioning or setting aside or reserving exclusive-use display areas 106* were shown, from the descriptions to follow, those skilled in the art will appreciate that depending on how the coordinate system or pixel configuration is implemented by the operating system of the computer system, some embodiments are more suitable for one operating system, while other embodiments may be more suitable for another operating system. Of course, other variations of partitioning or setting aside or reserving exclusive-use display areas may also be practiced. It should also be noted that each assigned application 110 may elect to employ multiple windows in rendering contents in its assigned EDA 106*. However, for ease of understanding, the remaining description will substantially be confined to the scenario where an un-windowed or single window approach is employed in each of the assigned EDA 106*. (The symbol * after reference number 106 stands for a "wildcard", which in this case may be any one of the letters "a" through "aa".)

Figure 2:
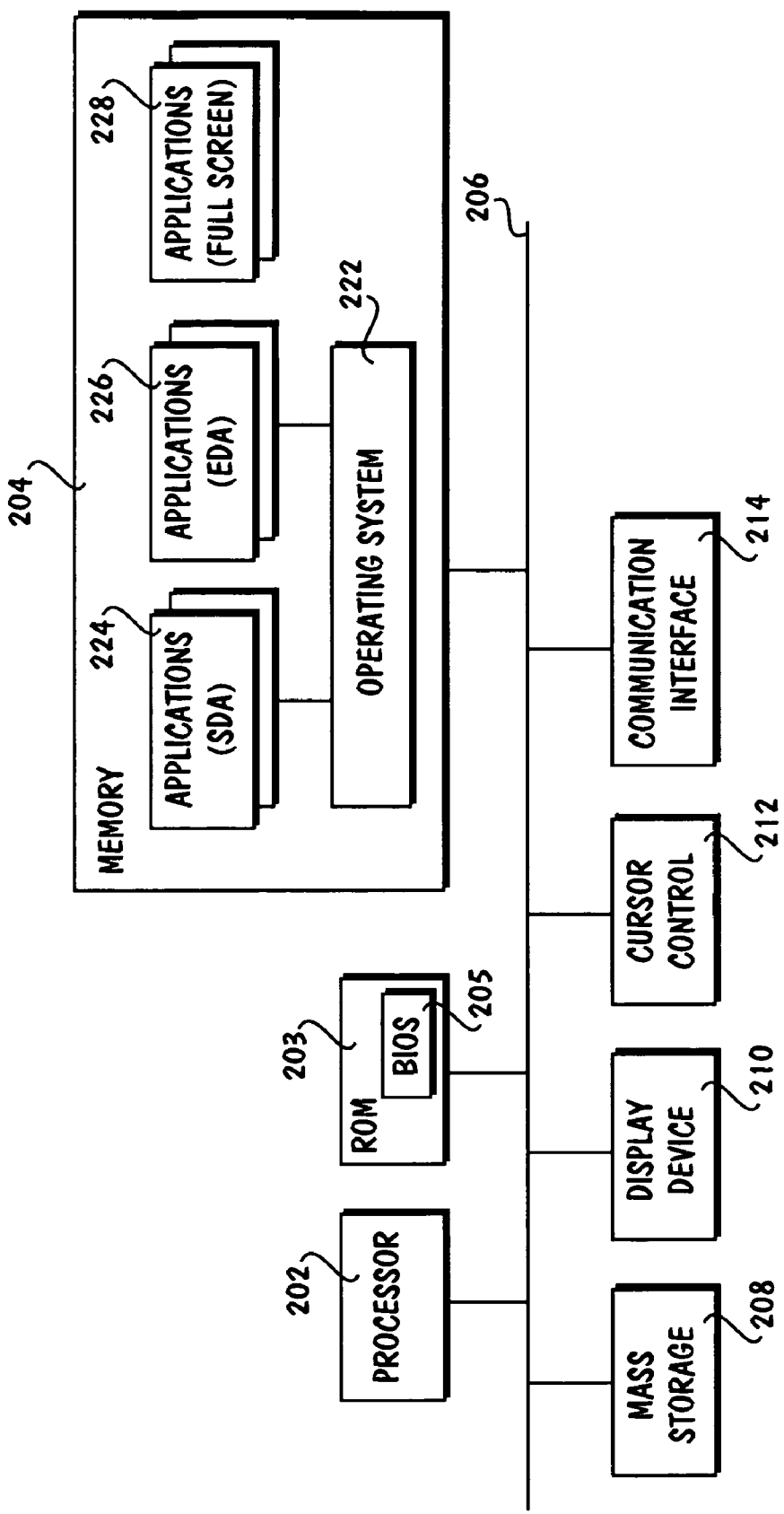
FIG. 2 illustrates an example computer system suitable for practicing the present invention.

Referring now to FIG. 2, wherein an example computer system suitable for practicing the present invention is shown. As shown, example computer system 200 includes processor 202, ROM 203, and system memory 204 coupled to each other via "bus" 206. Coupled also to "bus" 206 are non-volatile mass storage 208, display device 210, cursor control device 212 and communication interface 214. ROM 203 includes a basic input/output system (BIOS) 205. During operation, memory 204 includes working copies of operating system 222, applications 224 that use the shared display area (see FIGS. 1a-1f) of the display surface of display device 210, and applications 226 that use correspondingly assigned exclusive-use display areas (see FIGS. 1a-1f) of the display surface of display device 210. For some embodiments, memory 204 further includes working copies of applications 228 that use the entire display area (also referred to as "full screen" applications). Operating system 222, applications 226, and in some embodiments, applications 224 and 228 are incorporated with the teachings of the present invention. Examples of SDA applications 224 are conventional word processing applications, spread sheet applications, and the like. Examples of EDA applications 226 include advertisements, as alluded to earlier, messaging applications, and the like. Examples of "full screen" applications 228 include multi-media games and the like.

Except for the teachings of the present invention incorporated, each of these elements is intended to represent a wide range of these devices known in the art, and perform its conventional functions. For example, processor 202 may be a processor of the Pentium® family available from Intel Corporation of Santa Clara, Calif., or a processor of the PowerPC® family available from IBM of Armonk, N.Y. Processor 202 performs its conventional function of executing programming instructions of operating system 222 and applications 224-228, including those implementing the teachings of the present invention. ROM 203 may be EEPROM, Flash and the like, and memory 204 may be SDRAM, DRAM and the like, from semiconductor manufacturers such as Micron Technology of Boise, Id. Bus 206 may be a single bus or a multiple bus implementation. In other words, bus 206 may include multiple buses of identical or different kinds properly bridged, such as Local Bus, VESA, ISA, EISA, PCI and the like.

Mass storage 208 may be disk drives or CDROMs from manufacturers such as Seagate Technology of Santa Cruz of CA, and the like. Typically, mass storage 208 includes the permanent copy of operating system 222 and applications 224-228. The permanent copy may be installed in the factory, or in the field. For field installation, the permanent copy may be distributed using article of manufactures with recordable medium such as diskettes, CDROM, DVD and the like, or downloaded from a distribution server through a data network (such as the Internet). The distribution server may be a server of the OEM, i.e. the software developer, such as Microsoft of Redmond, Wash., if an operating system of the Window® family is used, or a server of a publisher, such as Red Hat of Durham, N.C., if Linux is used instead.

Display device 210 may be monitors of any types from manufacturers such as Viewsonic of City, State. Cursor control 212 may be a mouse, a track ball and the like, from manufacturers such as Logictech of Milpitas, Calif. Communication interface 214 may be a modem interface, an ISDN adapter, a DSL interface, an Ethernet or Token ring network interface and the like, from manufacturers such as 3COM of San Jose, Calif.

As those skilled in the art will also appreciate, from the description the follow, the present invention may also be practiced without some of the enumerated elements, e.g. mass storage 208, or with additional elements, such as graphics accelerators, audio and video add-on cards, and so forth. Furthermore, while for ease of understanding, the term "applications 226" is used to refer to "applications" assigned to use the exclusive-use display areas, in alternate embodiments, through appropriate use of an "emulation interface", one or more of applications 226 may be another operating system instead.

Figure 3:
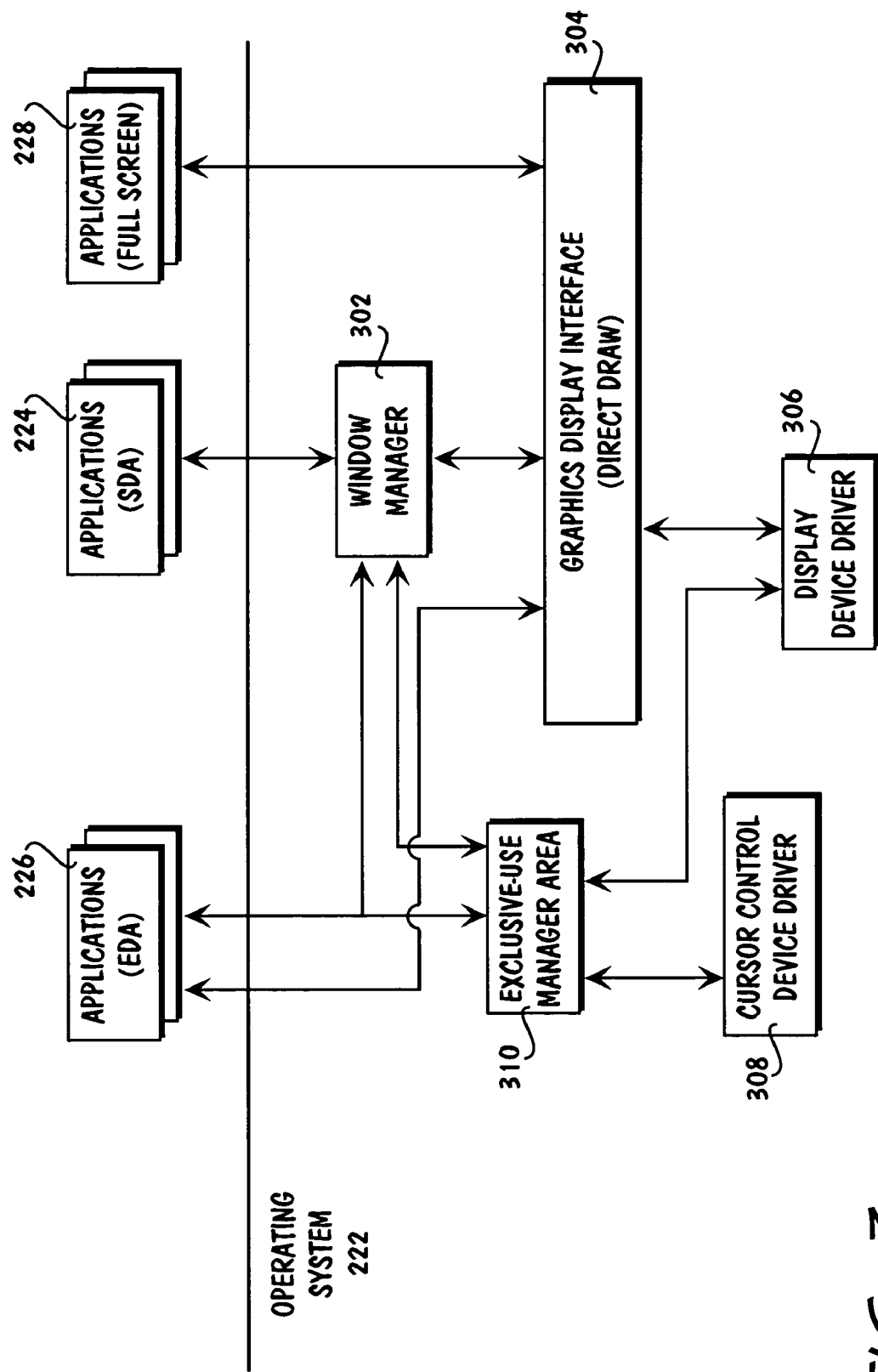
FIG. 3 illustrates the operating system of FIG. 2 in further details, and its interaction with the various applications, in accordance with one embodiment.

Referring now the FIG. 3, wherein a block diagram illustrating enhanced operating system 222 and its interactions with applications 224-228 is shown. As illustrated, operating system 222 includes conventional elements such as window manager 302, graphics manager 304, display device driver 306, and cursor control device driver 308. Each of these elements performs its conventional functions known in the art. That is, window manager 302 performs the conventional function of managing the current display of the various display windows of applications 224 in the SDA (see FIGS. 1a-1f). Graphics manager 304 performs the conventional function of rendering graphics objects for an application. Graphics manager 304 includes in particular, the capability of allowing an application to make direct draw onto the display surface of a display device. For example, for the Windows® operating systems, graphics manager 304 is intended to represent the Graphics Device Interface (GDI) and DirectX combined. (The two components are expected to be consolidated into a single component in GDI2K and beyond.) Display driver 306 performs the conventional function of controlling the display device, whereas cursor control device driver 308 performs the conventional function of monitoring movements of a cursor control device and cursor events (such as clicking or double clicking of a control button).

As illustrated, in accordance with the present invention, operating system 222 is also advantageously provided with exclusive-use display area manager 310. EDA manager 310 is employed to "coordinate" with window manager 302 to set up the shared and exclusive areas. Furthermore, EDA manager 310 is also employed to enable applications 226 to be able to correspondingly render contents into their assigned EDAs, and to respond to cursor device movements and events detected within their assigned EDAs. For the illustrated embodiment, SDA applications 224 render contents into their windows using graphics manager 304 through window manager 302, where a EDA and "full screen" applications 226-228 render contents into the EDAs and the entire display screen respectively using the direct draw functions of graphics manager 304. These and other aspects will be described more fully below with references to FIGS. 4a-4c.

Figure 4A:
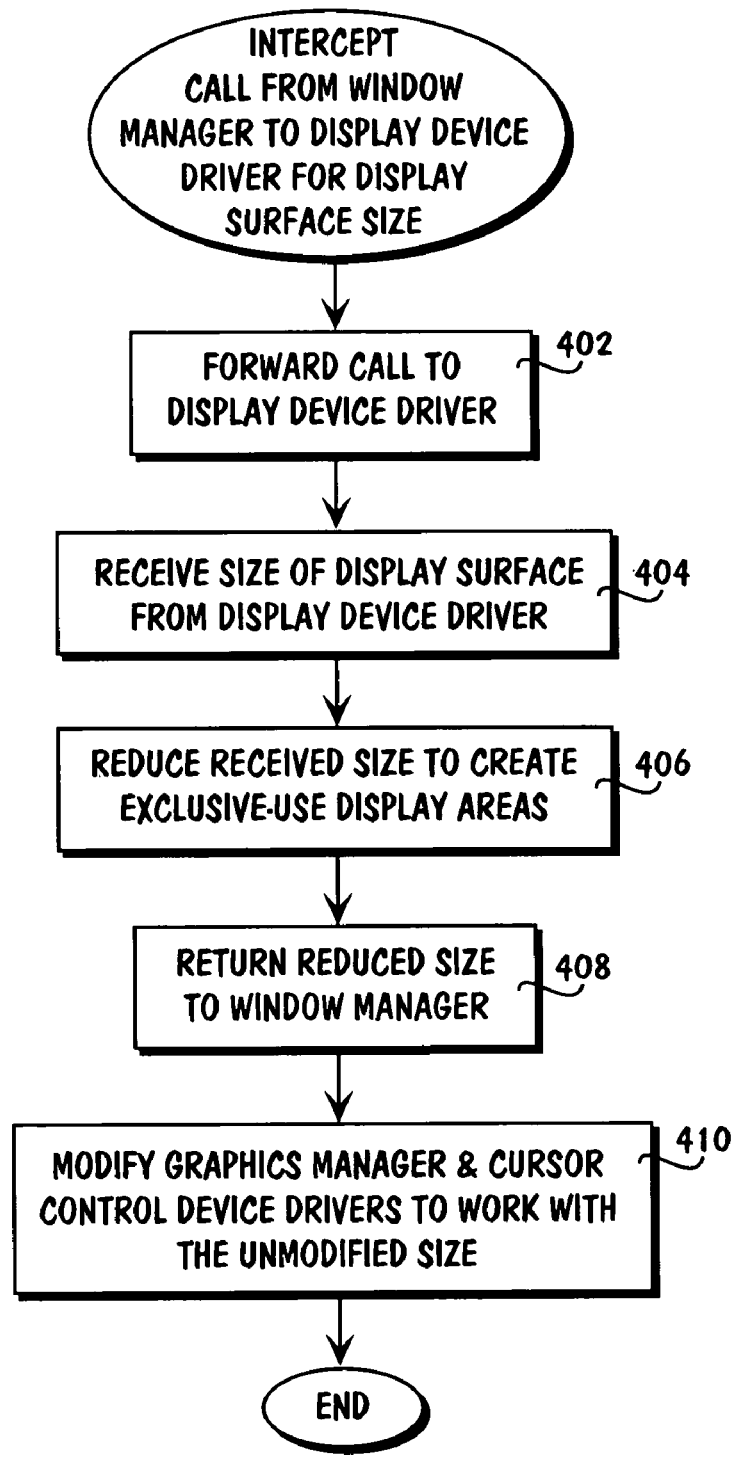
FIGS. 4a-4c illustrate various operational flows of the EDA manager of FIG. 3, in accordance with one embodiment.

FIG. 4a illustrates the operational flow of EDA manager 310 for "coordinating" with window manager 302 in setting up the shared and exclusive-use display areas, in accordance with one embodiment. As shown, for the illustrated embodiment, EDA manager 310 intercepts a call from window manager 302 to display device driver 306 to obtain the size of the display surface for the display device under the control of display device driver 306 for a particular graphics resolution. The interception or redirection to EDA manager 310 is accomplished in an operating system dependent manner. In one embodiment, where the operating system is of the Windows® family, the interception or redirection of the call is by modifying the registry and the system.ini file. For this embodiment, the call includes the graphics resolution, expressed in terms of a pixel resolution, e.g. 800×600 pixels.

Upon interception, at 402, EDA manager 310 forwards the call to display device driver 306. At 404, the display device driver 306 returns the size of the display surface of the display device under the control of display device driver 306 for the particular graphics resolution. In one embodiment, the size is expressed in terms of the width and height of the display surface. In one embodiment, the width and height are implicitly expressed in terms of maximum x and y coordinates. In one embodiment, where the operating system is of the Windows® family, the original of the x-y coordinate is by-definition the top left corner of the display surface.

For the illustrated embodiment, upon receipt of the size of display surface expressed in terms of width and height, at 406, EDA manager 310 reduces the width and height accordingly to set aside or reserve the EDA(s). In one embodiment, the number of EDA(s) to be created and the applications to be assigned to the various EDAs are specified through a configuration file, e.g. for an operating system of the Windows® family, through sections in the win.ini and system.ini files. Depending on the coordinate system of the operating system, multiple EDAs can be created with a single or successive operations of reducing the width and the height. For example, for the embodiment where the size is expressed in terms of maximum x ($x_{max}$) and maximum y ($y_{max}$) referencing an origin disposed at the top left corner of the display surface, the three EDAs of FIG. 1c may be created by reducing $x_{max}$ and $y_{max}$ to x' max and y'$_{max}$ where x'$_{max}$ and y'$_{max}$ are smaller than $x_{max}$ and $y_{max}$ respectively. EDAs 106f and 106g are the areas disposed along the bottom and the right edge of the display surface respectively, less the intersected area, which is treated as EDA 106e. Similarly, the six EDAs of FIG. 1e may be created by successively reducing $x_{max}$ and $y_{max}$ to x'$_{max}$ and y'$_{max}$, and x"$_{max}$ and y"$_{max}$, where x'$_{max}$ and y'$_{max}$ are smaller than $x_{max}$ and $y_{max}$, and x"$_{max}$ and y"$_{max}$ are smaller than x'$_{max}$ and y'$_{max}$, respectively. EDAs 106n-106s are the two rows of areas disposed along the bottom and the right edge of the display surface respectively. The successive reduction may even be performed through recursive invocation of a reduction function. In alternate embodiments, the allocation of the EDAs to applications 110 may be made dynamically instead, employing a resource allocation manager.

Upon reducing the size of the display surface, at 408, EDA manager 310 returns the reduced size to window manager 302, thereby "coordinating" the locations of the shared and exclusive-use display areas with window manager 302. In alternate embodiments, other expression of sizes as well as other coordinate systems may be employed. The manner in which the size is reduced, and the manner in which shared and exclusive-use areas are designated may simply be adjusted accordingly to the alternate approaches.

For the illustrated embodiment, it is assumed that upon receipt of the reduced size, window manager 302 also sets up graphics manager 304 and cursor control device driver 308 to operate with the same display surface information, i.e. the reduced size. Accordingly, at 410, EDA manager 310 overrides this information, restoring graphics manager 304 and cursor control device driver 308 to operate with the unreduced size, thereby allowing applications 226 to render contents into the EDAs through direct draw, and to be notified of detected cursor movements and a events in the EDAs. Towards the later objective, at 412, EDA manager 310 also modifies the set up of cursor control device driver 308 such that event notifications of cursor movements and events are provided to EDA manager 310 instead of window manager 302, for EDA manager 310 to filter out the detected cursor movements and events in the EDAs before allowing the residual detected cursor movements and events (within the shared display area) to be passed on to window manager 310.

In one embodiment, window manager 302 attempts to establish the size of display surface at each system start-up/reset. Accordingly, the operations illustrated in FIG. 4a are performed at each system start-up/reset.

In an alternate embodiment, operations 406-410 are not performed at each system start-up/reset. Instead they are performed only when the computer system is "on-line", e.g. connected to the Internet. That is, upon receiving the size of the display surface from display device driver 306 at system start/reset, EDA manager 310 forwards the information to window manager 302 without the earlier described reduction and conformance, operations 406-410. EDA manager 310 instead proceeds to monitor for the computer system going "on-line" (not shown in FIG. 4a). Only upon detection of such event, EDA manager 310 performs operations 406-410. (The monitoring/detection may be accomplished in any one of a number of operating system dependent manners known in the art.) Furthermore, upon performing operation 410, EDA manager 310 monitors for the computer system going "off-line" (also not shown in FIG. 4a). Upon detection of the computer system going "off-line", EDA manager 310 notifies window manager 302 to switch back to the unreduced screen size. Accordingly, the reservation, or the existence of the exclusive-use display areas are available only when the computer system is "on-line".

In yet another embodiment, operations 406-410 are performed only when a CD or a DVD is being used. Similar to the earlier described embodiment, upon receiving the size of the display surface from display device driver 306 at system start/reset, EDA manager 310 forwards the information to window manager 302 without the earlier described reduction and conformance, operations 406-410. EDA manager 310 instead proceeds to monitor for the presence and usage of a CD/DVD (not shown in FIG. 4a). Only upon detection of such event, EDA manager 310 performs operations 406-410. (The monitoring/detection may be accomplished in any one of a number of operating system dependent manners known in the art.) Furthermore, upon performing operation 410, EDA manager 310 monitors for the removal of the CD/DVD (also not shown in FIG. 4a). Upon detection of the removal of the CD/DVD, EDA manager 310 notifies window manager 302 to switch back to the unreduced screen size. Accordingly, the reservation, or the existence of the exclusive-use display areas are available only when a CD/DVD is being used.

As can be seen from these embodiments, in general, the exclusive use areas of the present invention may be facilitated upon occurrence of any one of a number of events, and the facilitation ceases upon occurrence of any one of a number of other events, including in particular, "complements" of the earlier events. In one embodiments, the computer system may be programmatically configured with these events.

Note that starting applications 110 assigned with the EDAs is a separate issue. These applications may be started as part of an auto start process at system start-up or they may be started on an as needed basis by a task manager or by other applications.

Figure 4B:
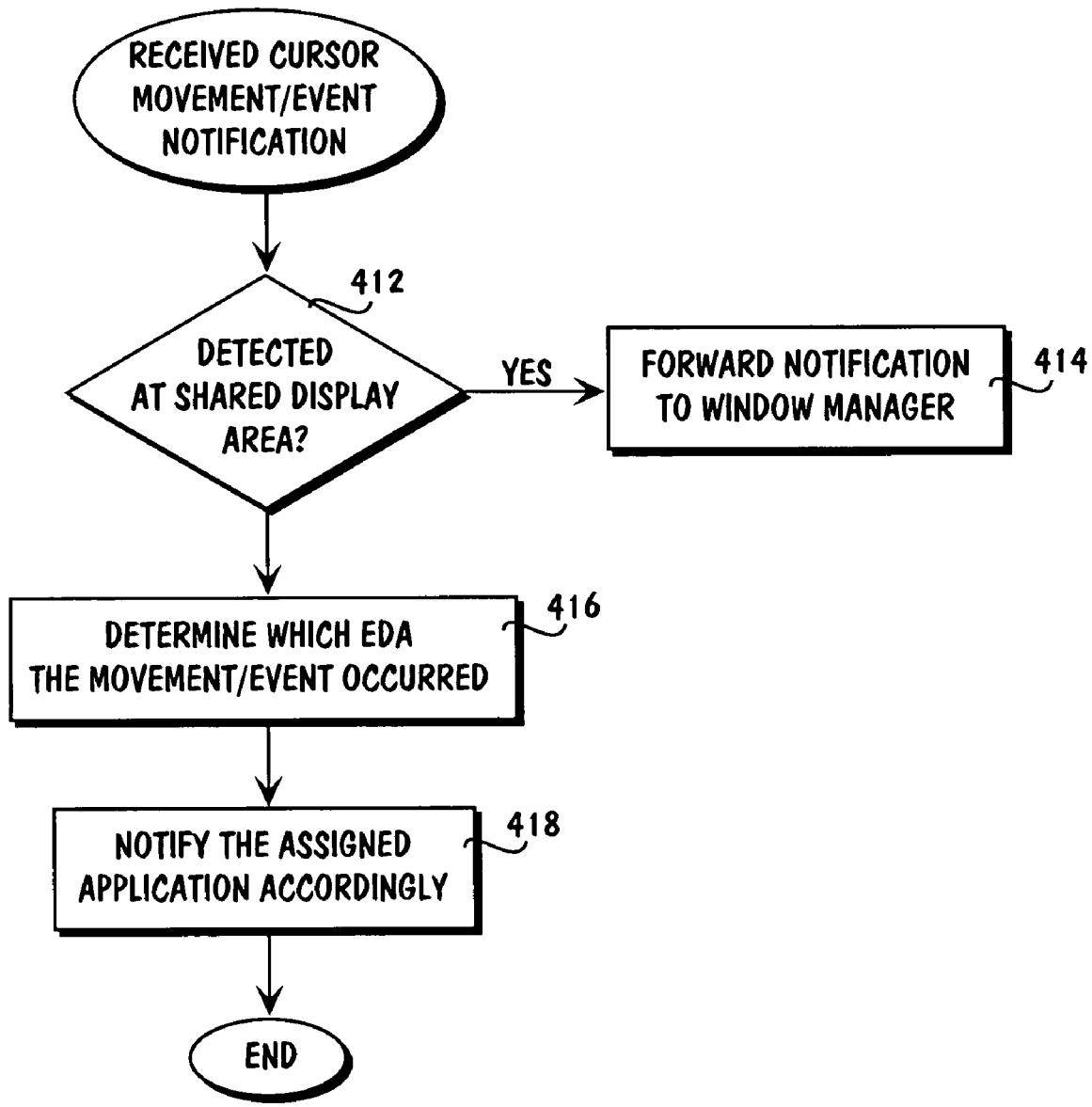

FIG. 4b illustrates the operational flow of EDA manager 310 for filtering cursor movement/event notifications, in accordance with one embodiment. Upon receipt of a cursor movement/event notification, at 412, EDA manager 310 first determines whether the movement/event was detected in the SDA or one of the EDAs. If the movement/event was detected in the SDA, at 414, EDA manager 310 forwards the notification to window manager 302. From there, operations proceed as in the prior art. On the other hand, if the movement/event was detected in one of the EDAs, at 414, EDA manager 310 determines within which EDA, the movement or event occurred. At 416, EDA manager 310 forwards the notification to the appropriate application 110 accordingly. The manner in which the notification is handled is application dependent.

Figure 4C:
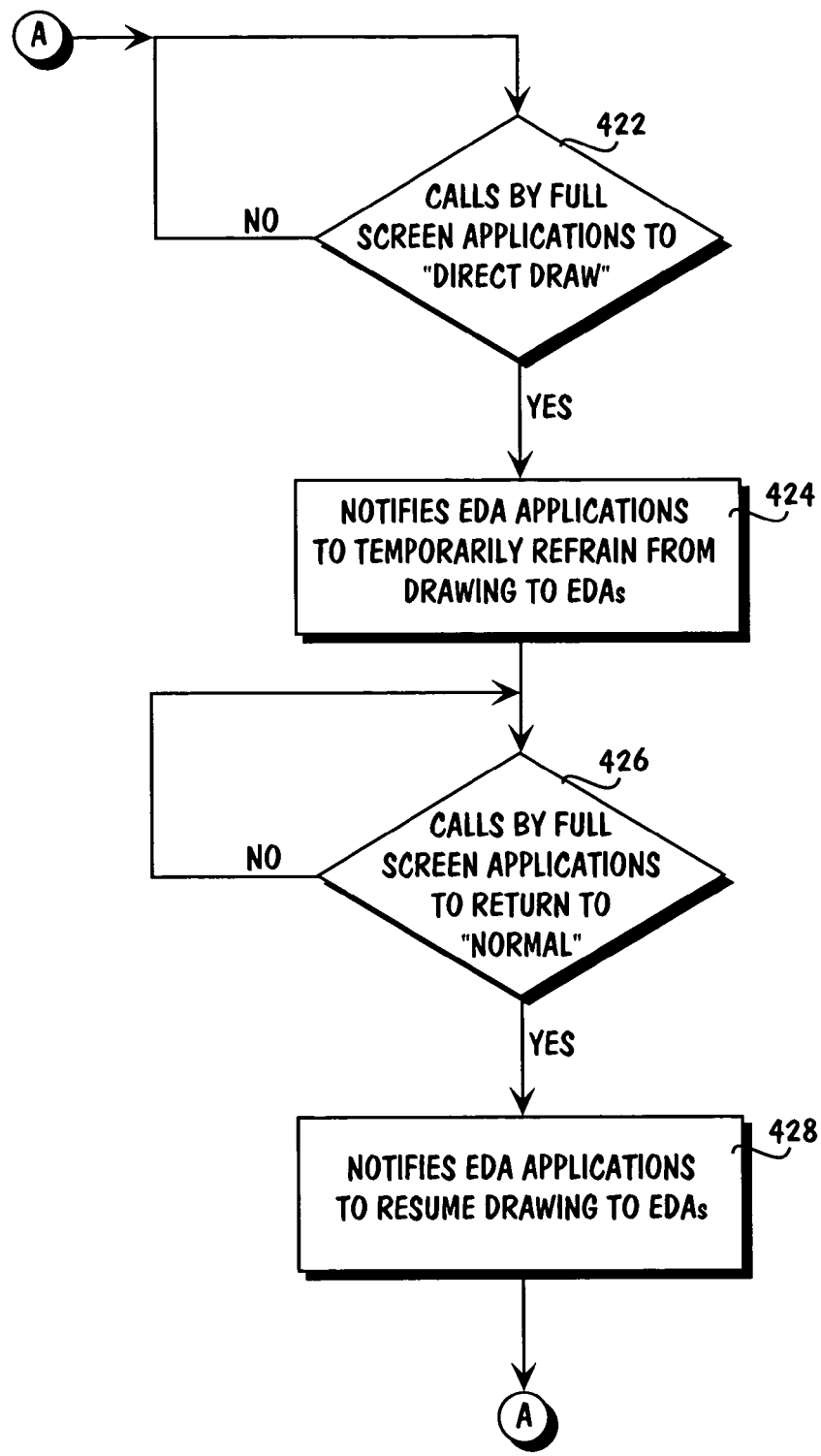

FIG. 4c illustrates the operational flow of EDA manager 310 for accommodating "full screen" applications 226, in accordance with one embodiment. At 422, EDA manager 310 monitors for calls by any one of "full screen" applications 228 to the direct draw functions of graphics manager 304 to enter a "full screen" mode of operation. Upon detection of one of such calls, EDA manager 310, at 424, notifies EDA applications 226 to temporarily refrain from drawing to the EDAs. EDA manager 310 then monitors for a call by the current full screen occupying application 226 to the direct draw functions of graphics manager 304 to restore the normal "non-full screen" mode of operation, 426. Upon detection of such a call, EDA manager 310, at 428, notifies EDA applications 226 that they may resume using the EDAs again. Thus, "full screen" applications are accommodated.

In an alternate embodiment where "full screen" applications 228 employ the feature referred to as "page flipping", instead of accommodating the "full screen" applications 228 by temporarily removing the EDAs, the current full screen occupying application 228 may actually leave a perimeter of pixels for use as EDAs (e.g. like FIG. 1c), and notifies EDA manager 310 of the size. In response, instead of instructing EDA applications 226 to temporarily refrain from drawing to the EDAs, EDA manager 310 will intercept the "page flip" call by the current full screen occupying application, and coordinate having EDA applications 226 write to the "unused" locations of the "back" buffer (unused by the full screen occupying applications), using the direct draw functions of graphics manager 304, before forwarding the "page flip" call onward and have the "page flip" operation performed (that is, moving the content of the "back" buffer to the "front" buffer). Accordingly, the EDAs of the present invention as well as the "full screen" applications may both be accommodated.

Figure 4D:
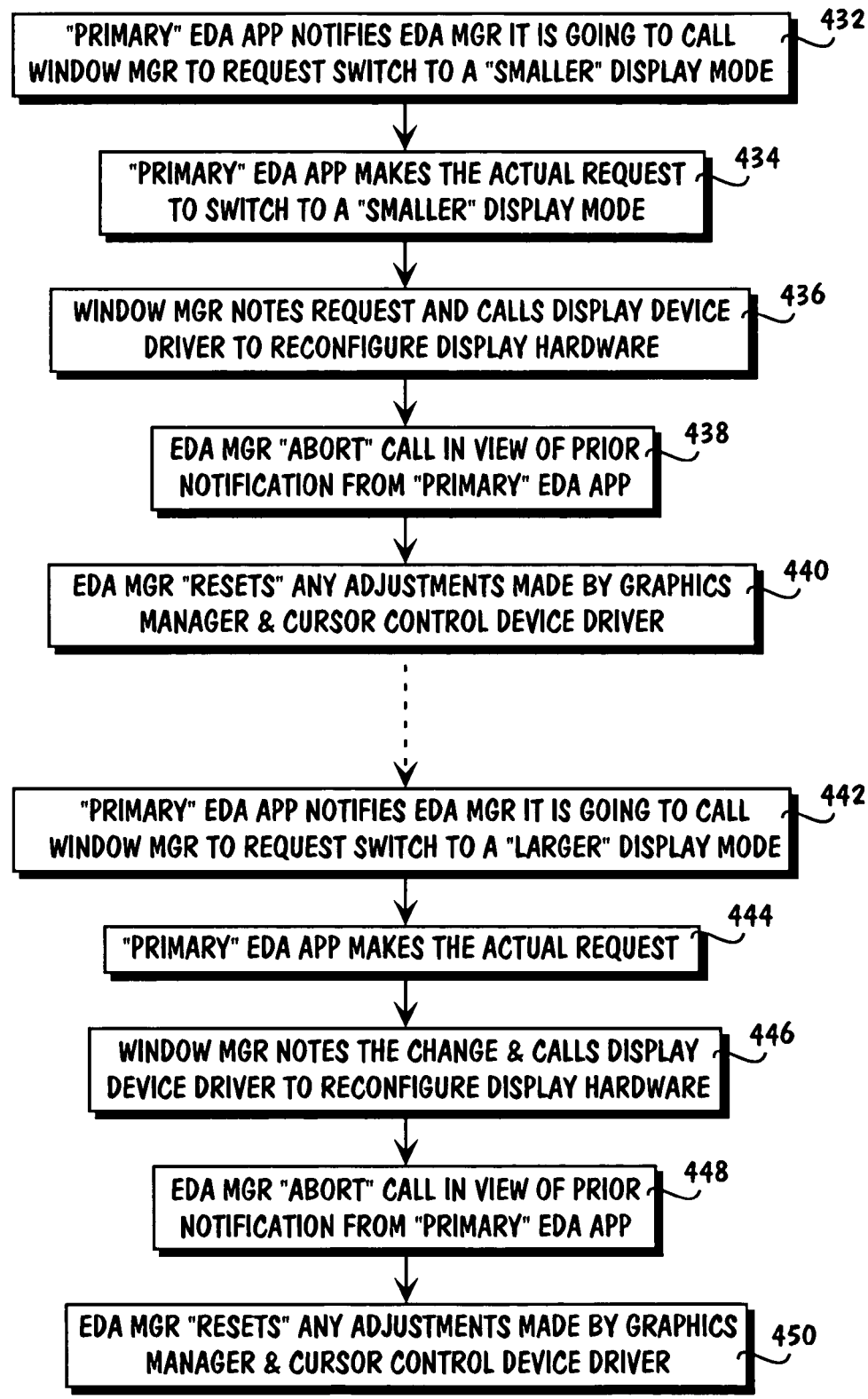

FIG. 4d illustrates the operational flow of EDA manager 310 for "coordinating" with window manager 302 in setting up the shared and EDAs, in accordance with another embodiment (i.e. an alternate embodiment to FIG. 4a). In this embodiment, it is assumed that SDA applications 224 include an application that monitors for the computer system going "on-line" and "off-line". Upon detecting the computer system going "on-line", the application causes a number of EDA applications 226 to be launched, and upon detecting the computer system going "off-line", the application causes the launched EDA applications 226 to be terminated. In one implementation, the SDA application is an enhanced browser with a "plug in", such as an ActiveX control to perform the monitoring. Furthermore, it is also assumed that the launched EDA applications 226 include a "primary" application that initiates the reservation or creation of the EDAs.

As illustrated, upon invocation, "primary" EDA application 226 first notifies EDA manager 310 that it is going to call window manager 302 to request window manager 302 to change to a "smaller" display mode (in terms of pixels), 432. At 434, "primary" EDA application 226 makes the actual call to window manager 302 to request the "smaller" display mode. In response, window manager 302 internally notes the change (and hencefore manages the display windows within the SDA accordingly), and calls display device driver 306 to reconfigure the display hardware (by way of EDA manager 310), 436. EDA manager 310, having been alerted by "primary" EDA application 226 ignores the request without forwarding it to display device driver 306, effectively aborting the call, 438. As a result, the display hardware is still configured for the "larger" display mode (in terms of pixels), while window manager 302 manages display windows of SDA applications 224 in accordance with a "smaller" display mode. Accordingly, the desired EDAs are effectively reserved or created.

Similar to FIG. 4a, it is also assumed that upon "calling" display device driver 306 to reconfigure the display hardware to the "smaller" display mode, window manager 302 will set up graphics manager 304 and cursor control device driver 308 to work with the "smaller" display mode. At 440, EDA manager 310 overrides these set up, and restoring graphics manager 304 and cursor control device driver 308 to operate with the "larger" display mode, thereby allowing EDA applications 226 to render contents into the EDAs through the direct draw function of graphics manager 304, and to be notified of detected cursor movements and events in the EDAs.

As part of the termination process, "primary" EDA application 226 also first notifies EDA manager 310 that it is going to call window manager 302 to request window manager 302 to change to a "larger" display mode (in terms of pixels), 442. At 444, "primary" EDA application 226 makes the actual call to window manager 302 to request the "larger" display mode. In response, window manager 302 internally notes the change (and henceforth manages the display windows of the SDA accordingly), and calls display device driver 306 to reconfigure the display hardware (by way of EDA manager 310), 446. EDA manager 310, having been alerted by "primary" EDA application 226 again ignores the request without forwarding it to display device driver 306, again effectively aborting the call, 448. As a result, window manager 302 returns to managing display windows of SDA applications 224 in accordance with the "larger" display mode, consistent with the display hardware. At 450, EDA manager 310 resets graphics manager 304 and cursor control device driver 308, as operation 440. Accordingly, the EDAs are effectively unreserved or eliminated.

Those skilled in the art will appreciate that since the EDAs are reserved and unreserved without requiring display device driver 306 actually reconfiguring the display hardware, a user will see the contraction of the shared display area (and formation of the EDAs) as well as the expansion of the shared display area (and elimination of the EDAs) without seeing the blanking of the display device (caused by the reconfiguration of the display hardware), a very desirable usability feature.

Similar to the embodiment of FIG. 4a, detection of cursor movements and events within the EDAs may be facilitated as described earlier with reference to FIG. 4b, and "full screen" applications 228 may be accommodated as earlier described referencing FIG. 4c.

Figure 5:
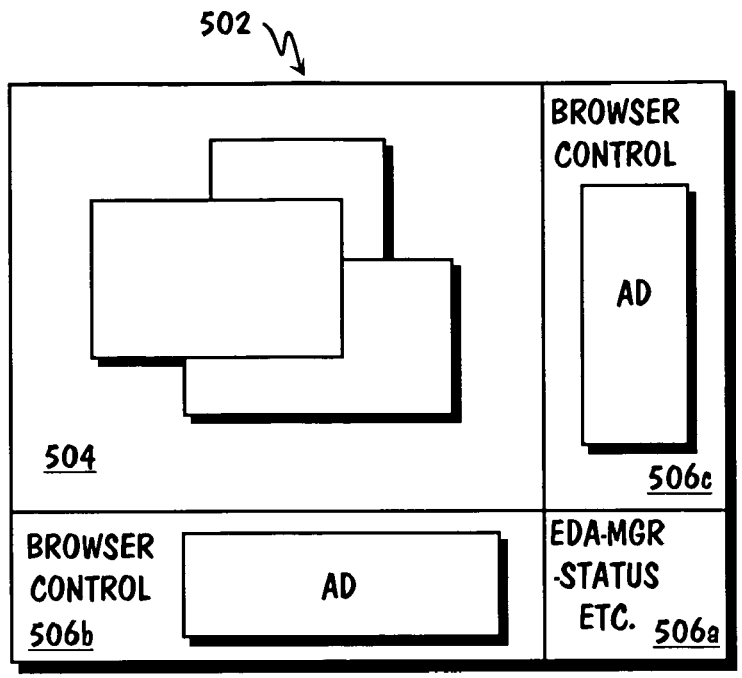
FIGS. 5-6 illustrate application of the present invention to advertisement rendering, in accordance with two embodiments.
Figure 6:
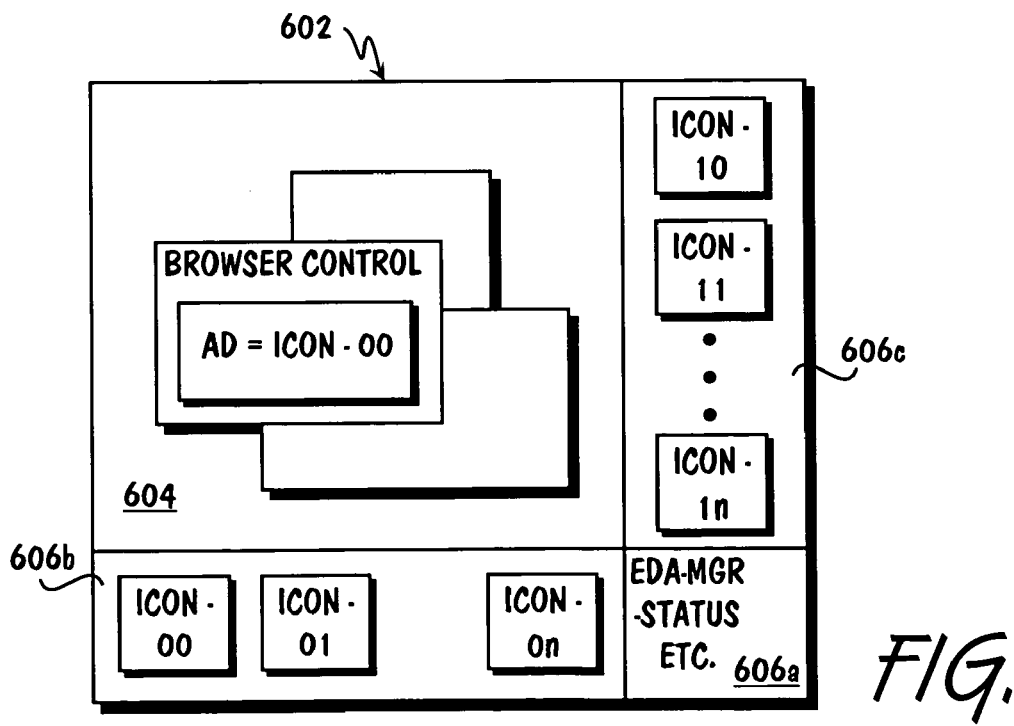

Referring now to FIGS. 5-6, wherein an example application of the present invention to rendering advertisement, in accordance with two embodiments are shown. As illustrated, both in FIGS. 5-6, EDA manager 310 assigns one of the EDAs, more specifically, EDA 506a or 606a disposed at the lower right corner of display surface 502, to display its identification signifying its presence and operation in the system, along with status and other control information. Additionally, for the illustrated embodiment, at least one of the applications 110 assigned with corresponding EDAs 506b and 506c or 606b and 606c is an advertisement rendering program for rendering advertisements (e.g. advertisements received from a remote server (such as a web server) through a data network (such as the Internet)).

For FIG. 5, it is assumed that the advertisements are constituted with Hypertext Mark-Up Language (HTML) pages, and each advertisement rendering program is an instance of a browser program, such as the Internet Explorer available from Microsoft or Navigator available from Netscape, recently acquired by America On-Line of Dulles, Va. By virtue of the browser's exclusive use of its assigned display area 506b or 506c, the advertisement rendered are persistently visible, independent of changes in the shared display area 504.

For FIG. 6, it is also assumed that the advertisements are also constituted with Hypertext Mark-Up Language (HTML) pages, however the advertisement rendering program assigned the EDA is merely a program that renders iconic representations for advertisements in the assigned EDA, e.g. trademarks or service marks of the advertisers. The program, in response to a user selection of a corresponding displayed iconic representation of an advertisement, launches an instance of a browser program to render the advertisement in a conventional browser window 608 disposed in SDA 604. Although for this embodiment, the advertisements themselves are not persistently visible, but their iconic representations, by virtue of the program's exclusive use of the display areas, are persistently visible. Although not proportionally illustrated, EDAs 606b and 606c may be substantially smaller than EDAs 506b and 506c, thereby offering a compromised tradeoff of having a larger shared display area 604, and yet maintaining a small amount of persistently visible display areas 606b-606c.

Figure 7:
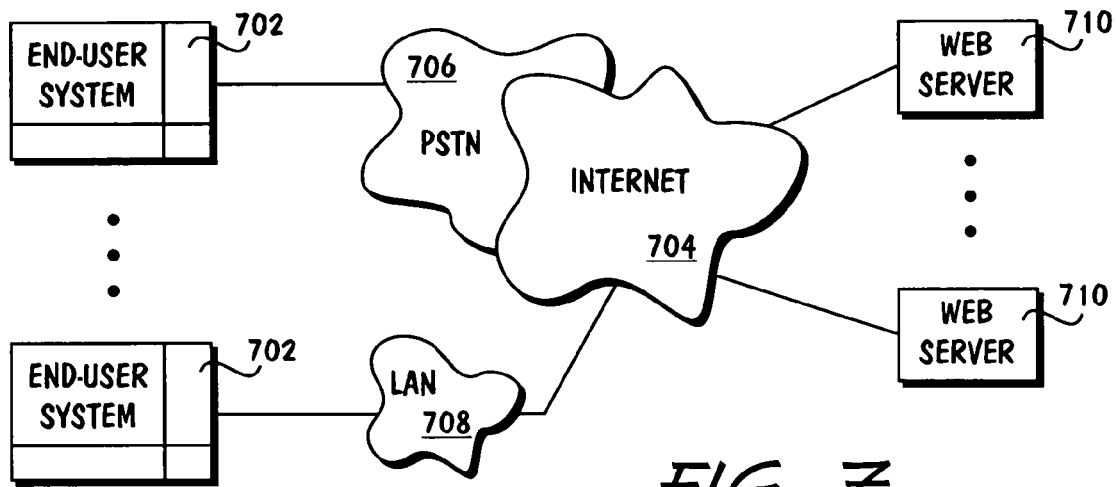
FIGS. 7-8 illustrate application of the present invention to Internet advertising in further details, in accordance with one embodiment.
Figure 8:
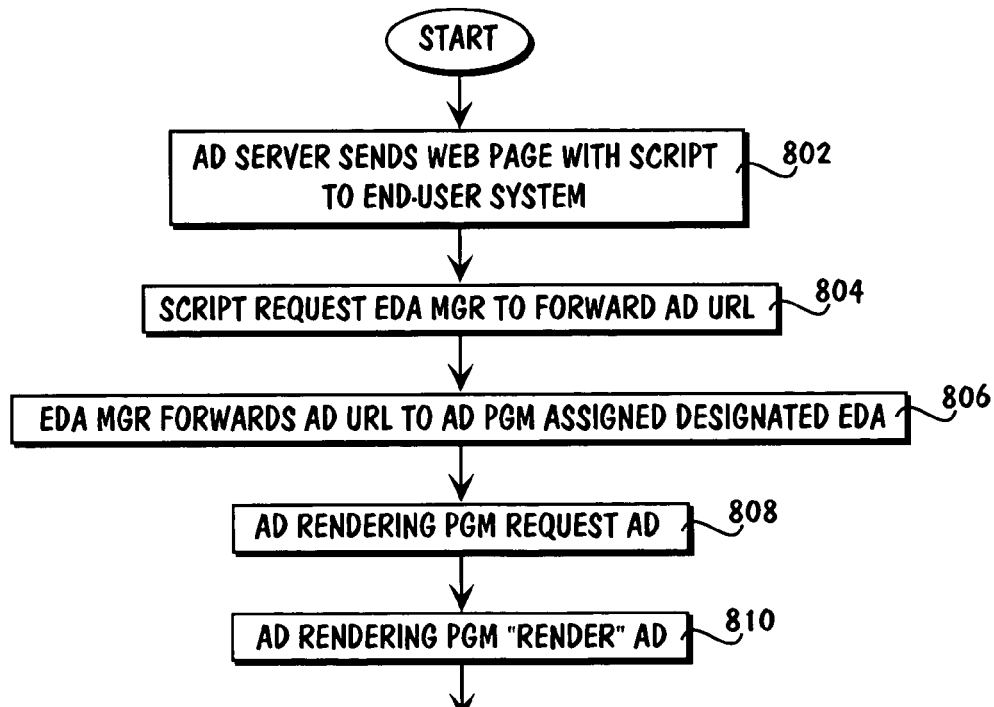

Referring now to FIGS. 7-8, wherein two block diagrams illustrating the example application of the present invention to advertising, more specifically, to Internet advertising, in further details, are shown. As illustrated, FIG. 7 is a network view of an improved approach to Internet advertising including end-user systems 702 incorporated with the teachings of the present invention set forth above, and web-based advertisement servers 710 equipped to exploit the presence of end-user systems 702 with persistent visibility provided through the present invention. End user systems 702 are coupled to the Internet 704, some through the conventional PSTN 706, while others through their private/public LAN 708.

FIG. 8 illustrates the operational flow of the Internet advertising method of the present invention, in accordance with one embodiment. As shown, at 802, server 710 transmits a web page to one of the end-user systems 702 in response to a "request" for the web page from the particular end-user system 702. As in the prior art, the request and response may be accomplished through e.g. an http connection that includes an URL denoting the web page or the particular server 710. In accordance with the present invention, the web page includes a script, e.g. a Javascript, that requests EDA manager 310 to provide an URL identifying one or more advertisements to an advertisement rendering program assigned to a designated exclusive-use display area, e.g. the EDA disposed along the bottom edge of the display surface. (The advertisement rendering program may be an embodiment of the FIG. 5*a* type or an embodiment of the FIG. 5*b* type, or embodiment of other like type.) Thus, upon receipt, at 804, the embedded script makes the request accordingly.

At 806, EDA manager 310 provides the URL to the advertisement rendering program assigned the designated EDA accordingly. In response, at 808, the advertisement rendering program opens another http connection to the specified resource location to retrieve the specified advertisements. Upon receipt of the advertisements, the advertisement rendering program renders the advertisements accordingly, as described above.

Thus, a method and an apparatus for creating exclusive-use display areas, and using them for persistently visible display of contents, such as advertisement, have been described.

While the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A method to be performed on a computer system having a display device, the method comprising:
   reserving a first portion of a primary display area of a display surface of the display device, the primary display area being controllable by an operating system and to be dedicated for exclusive use and control by a first application program that is not part of said operating system, excluding all other programs, including said operating system, from using or controlling said reserved first portion of operating system controllable primary display area, and the display surface further has an overscan area that is not controllable by the operating system; and
   maintaining said first portion for exclusive use by said first application program, as long as the first portion is reserved for exclusive use by the first application program, until a new reservation is made for said first portion, or until said first portion is released from the reservation made by said reserving.

2. The method of claim 1, wherein said reserving comprises requesting a window manager to switch to a display mode having a smaller pixel configuration.

3. The method of claim 2, wherein said reserving further comprises aborting a responsive request by the window manager to a display device driver to configure a display hardware to said smaller pixel configuration.

4. The method of claim 2, wherein said reserving further comprises pre-alerting a display area manager of said display mode switch request to said window manager.

5. The method of claim 1, wherein
   the method further comprises determining if a first event has occurred; and
   said reserving is performed only if the first event is determined to have occurred.

6. The method of claim 5, wherein the method further comprises
   determining if a second event has occurred; and
   unreserving said first portion of the operating system controllable primary display area for use by said first application program if the second event is determined to have occurred.

7. The method of claim 6, wherein said unreserving comprises requesting a window manager to switch to a display mode having a larger pixel configuration.

8. The method of claim 7, wherein said unreserving further comprises aborting a responsive request by the window manager to a display device driver to configure a display hardware to said larger pixel configuration.

9. The method of claim 7, wherein said reserving further comprises pre-alerting an display area manager of said display mode switch request to said window manager.

10. The method of claim 1, wherein the method further comprises
    monitoring for a request by an application to change a display mode to a full screen mode; and
    notifying said first application program to temporarily stop rendering contents in said reserved first portion of the operating system controllable primary display area.

11. The method of claim 10, wherein the method further comprises
    monitoring for a request by an application to change a display mode from a full screen mode to a normal mode; and
    notifying said first application program to resume rendering contents in said reserved first portion of the operating system controllable primary display area.

12. The method of claim 1, wherein the method further comprises
    monitoring for a request by an application to change a display mode to a full screen mode; and
    upon detecting such as request, intercepting all page flipping calls by said application, and forwarding each of said page flipping calls onward only after said first application program has updated a back buffer.

13. The method of claim 12, wherein the method further comprises interacting with said full screen mode requesting application to maintain said reserved first portion of the operating system controllable primary display area.

14. A method to be performed on a computer system having a display device, the method comprising:
    pre-alerting a display area manager of a display mode switch request to a window manager;
    submitting said display mode switch request to said window manager; and
    aborting a responsive request by the window manager to a display device driver to configure a display hardware in accordance with said display mode switch request, to effectuate reservation of an area of a primary display area of a display surface of the display device, the primary display area being controllable by the operating system and to be dedicated for exclusive use and control by an application program that is not part of the operating system, excluding all other programs, including the operating system, from using or controlling the reserved area of the operating system controllable primary display area, and the display surface further has an overscan area that is not controllable by the operating system.

15. The method of claim 14, wherein said display mode switch request is a request to switch to a selected one of a smaller and a larger pixel configuration.

16. A method to be performed on a computer system having a display device, the method comprising:
- determining if a first event has occurred;
- operating the display device with a primary display area of a display surface of the display device, the primary display area being controllable by the operating system, the primary display area further having one or more display areas whose contents are persistently visible and controlled by a first application program that is not part of the operating system, excluding all other programs, including the operating system, from using or controlling the one or more display areas, if the first event is determined to have occurred, and the display surface further has an overscan area that is not controllable by the operating system;
- determining if a second event has occurred; and
- operating the display device with the primary display area having no display area whose contents are persistently visible and controlled by an application program that is not part of the operating system, excluding all other programs, including the operating system, from using or controlling, if the second event is determined to have occurred.

17. The method of claim 16, wherein said operating of the display device with the operating system controllable primary display area having one or more display areas whose contents are persistently visible and controlled by a first application program further comprises accommodating the first application program to operate in a full screen mode.

18. The method of claim 17, wherein said accommodating comprises temporarily suspending rendering contents into said display areas.

19. The method of claim 17, wherein said accommodating comprises interacting with said first application program that operates in a full screen mode to at least partially maintain said display areas.

20. A method to be performed on a computer system having a display device, the method comprising:
- intercepting a page flipping call by an application that is not part of the operating system, operating in a full screen mode;
- updating locations of a back buffer unused by said application with contents to be persistently visible in an area of a primary display area of a display surface of the display device, the primary display area being controllable by the operating system, the primary display are being reserved for use and control by the application, excluding all other programs, including the operating system, form using or controlling the reserved area of the operating system controllable primary display area, and the display surface further has an overscan area that is not controllable by the operating system; and
- forwarding said page flipping call onward after said updating.

21. An article of manufacture comprising:
- a processor readable storage medium having stored thereon a plurality of programming instructions to be executed by a processor reading the programming instructions from the storage medium, wherein when executed, perform the operations set forth in claim 1.

22. An article of manufacture comprising:
- a processor readable storage medium having stored thereon a plurality of programming instructions to be executed by a processor reading the programming instructions from the storage medium, wherein when executed, perform the operations set forth in claim 14.

23. An article of manufacture comprising:
- a processor readable storage medium having stored thereon a plurality of programming instructions to be executed by a processor reading the programming instructions from the storage medium, wherein when executed, perform the operations set forth in claim 16.

24. An article of manufacture comprising:
- a processor readable storage medium having stored thereon a plurality of programming instructions to be executed by a processor reading the programming instructions from the storage medium, wherein when executed, perform the operations set forth in claim 20.

25. An apparatus comprising:
- a storage medium having stored therein a plurality of programming instructions designed to implement a display device driver to render displays on an operating system controllable primary display area of a display device, and a use manager to cooperate with said display device driver to effectuate reservation of a first sub-portion of said operating system controllable primary display area to be dedicated for exclusive use or control by an application program that is not part of the operating system, excluding all other programs, including the operating system, from using or controlling the reserved first sub-portion of said operating system controllable primary display area, and to maintain said first sub-portion for exclusive use by said application program, as long as the first sub-portion is reserved for exclusive use by the application program, until a new reservation is made for said first sub-portion, or until said first portion is released from the reservation made by said reserving, the display device further having an overscan area not controlled by the operating system; and
- a processor coupled to the display device and the storage medium to execute the programming instructions.

26. The apparatus of claim 25, wherein the use manager is equipped to receive an alert of a display mode change request from a window manager to said display device driver, and in response, upon intercepting said display mode change request, aborting said display mode change request.

27. The apparatus of claim 25, wherein the use manager is equipped to monitor for a display mode change request to enter a full screen mode of operation from an application, and in response, notifying applications associated with said use display areas to temporarily suspend rendering contents into said use display areas.

28. The apparatus of claim 25, wherein the use manager is equipped to monitor for a display mode change request to enter a full screen mode of operation from an application, and interact with said application to at least partially maintain said display areas.

29. The apparatus of claim 28, wherein the use manager is further equipped to intercept page flipping calls by said application, and facilitating rendering of contents into said display areas by applications associated with the display areas prior to forwarding the intercepted page flipping calls.

30. An apparatus, comprising:
- a storage medium having stored therein a plurality of programming instructions designed to reserve a first portion of a primary display area of a display surface of a display device, the primary display area being controllable by an operating system and to be dedicated for exclusive use and control by a first application program that is not part of said operating system, excluding all other programs, including said operating system, from using or controlling said reserved first portion of operating system controllable primary display area, and the display surface further has an overscan area that is not controllable by the operating system; and to maintain said first portion for exclusive use by said first application program, as long as the first portion is reserved for exclusive use by the first application program, until a new reservation is made for said first portion, or until said first portion is released from the reservation made by said reserving; and a processor coupled to the storage medium to execute the programming instructions.

31. The apparatus of claim 30, further comprising a display device coupled to the processor.

32. An apparatus, comprising:

means for reserving a first portion of a primary display area of a display surface of the display device, the primary display area being controllable by an operating system and to be dedicated for exclusive use and control by a first application program that is not part of said operating system, excluding all other programs, including said operating system, from using or controlling said reserved first portion of operating system controllable primary display area, and the display surface further has an overscan area that is not controllable by the operating system; and means for maintaining said first portion for exclusive use by said first application program, as long as the first portion is reserved for exclusive use by the first application program, until a new reservation is made for said first portion, or until said first portion is released from the reservation made by said reserving.

* * * * *

UNITED STATES PATENT AND TRADEMARK OFFICE
CERTIFICATE OF CORRECTION

PATENT NO. : 7,523,415 B1  Page 1 of 1
APPLICATION NO. : 09/517874
DATED : April 21, 2009
INVENTOR(S) : Swain W. Porter It is certified that error appears in the above-identified patent and that said Letters Patent is hereby corrected as shown below:

Fig. 1b
" 108 |PGM| |PGM| 108 " should read -- 108 |PGM| ... |PGM| 108 --.

Fig. 1d
" 108 |PGM| |PGM| 108 " should read -- 108 |PGM| ... |PGM| 108 --.

Column 12
Line 16, "Claim 9...an display area manager..." should read --9...a display area manager...--.

Column 12
Line 38, "Claim 12...such as request,..." should read --12...such a request,...--.

Column 13
Line 46, "Claim 20..., the primary display are..." should read --20..., the primary display area...--.

Column 13
Line 49, "Claim 20..., form using or controlling..." should read --20..., from using or controlling...--.

Signed and Sealed this

Twenty-seventh Day of July, 2010

David J. Kappos
*Director of the United States Patent and Trademark Office*